May 28, 1963    N. P. BASHOR ETAL    3,091,704
BRIDGE CIRCUIT CONTROL MEANS WITH GANGED
SWITCHES EFFECTING LEAKAGE COMPENSATION
Filed Jan. 21, 1960    2 Sheets-Sheet 1
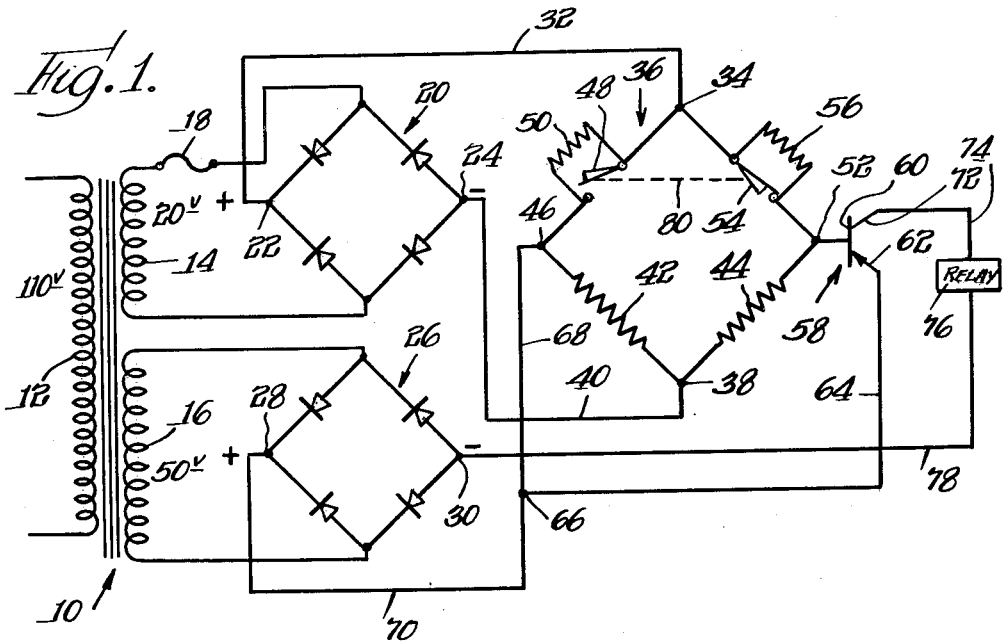
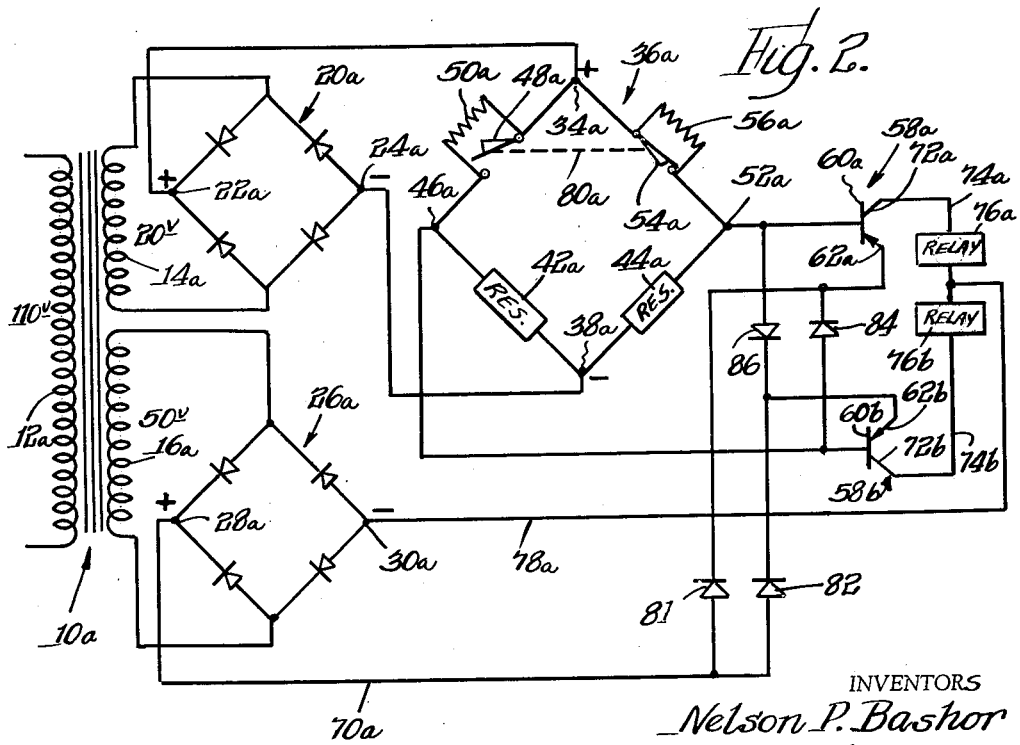
INVENTORS
Nelson P. Bashor
James W. Appelgren
By: Olson & Trexler  attys.

INVENTORS.
Nelson P. Bashor
James W. Appelgren
By: Olson & Trexler attys

United States Patent Office 3,091,704
Patented May 28, 1963

3,091,704
BRIDGE CIRCUIT CONTROL MEANS WITH GANGED SWITCHES EFFECTING LEAKAGE COMPENSATION
Nelson P. Bashor and James W. Appelgren, Rockford, Ill., assignors to W. F. and John Barnes Company, Rockford, Ill., a corporation of Illinois
Filed Jan. 21, 1960, Ser. No. 3,946
13 Claims. (Cl. 307—88.5)

This invention is concerned generally with limit switches as used in machine tools and the like, and particularly one which will work in a damp or wet environment.

As is well known, machine tools cut metals in various ways, usually with the cutting tools and the work surface wet by a liquid agent, such as oil, water, soda water, emulsified oil and water, and the like. This liquid tends to penetrate limit switches and to render their action unreliable, primarily by shorting out the open switch so that it appears to be closed, or nearly so.

Many coolants used in conjunction with machine tools are not inherently very good electrical conductors. However, when these are coupled with corrosion, a conductivity path may build up. Furthermore, even inherently non-conducting coolants, such as oil, may carry metal chips and shavings which tend to make the liquids substantially conducting.

Limit switches also are troubled by condensation. Manufacturing plants may cool off when shut down for a weekend to as low as 55° F., whereas the normal ambient temperature of an operating machine tool may be on the order of 92° F. and 100° F. This rather substantial drop in temperature may cause development of vacuum causing coolant, etc. to enter a switch, even when rather tightly sealed. Furthermore, when work is resumed on Monday morning, the first coolant used is quite cold, and further chills the switch. Switches generally can be sealed fairly satisfactorily against soaking, but not against cooling and attendant vacuum.

Encapsulated proximity switches may be rendered more or less proof against moisture, but often are not satisfactory. For example, a mechanical switch may have an accuracy of .003 inch or less, whereas a proximity switch may not work with an accuracy closer than about ⅛ inch.

In accordance with the present invention, it is proposed to provide a switch and circuit which will work even when the switch is wet. Thus, the switch may be sealed in as effective a manner as is economically warranted, and may be relied upon to work in spite of moisture penetration. The switch is used as a component part of an electrical circuit embodying a bridge which compares the zero or very low resistance of a closed switch with the resistance of the open switch, which generally will never approximate zero resistance, no matter how bad the moisture penetration and leakage path may become.

Accordingly, it is a principal object of this invention to provide a limit switch circuit which will function satisfactorily in a wet environment.

More specifically, it is an object of this invention to provide a limit switch in a bridge circuit wherein the resistance of a closed switch is compared with the resistance of an open switch.

Furthermore, it is an object of this invention to provide a switch as aforesaid in bridged circuit wherein two switches are provided in balancing arms of a bridge and are alternatively opened and closed to shunt out leakage paths, the bridge serving as a polarity reversing circuit.

Yet another object of this invention is to provide a limit switch in accordance with the foregoing paragraphs utilizing one or more transistors as relay control elements.

Other and further objects and advantages of the present invention will be apparent from the following description when taken in connection with the accompanying drawing wherein:

FIG. 1 is a schematic wiring diagram of a simple form of the invention;

FIG. 2 is a similar schematic wiring diagram of a more sophisticated form of the invention;

Figure 3:
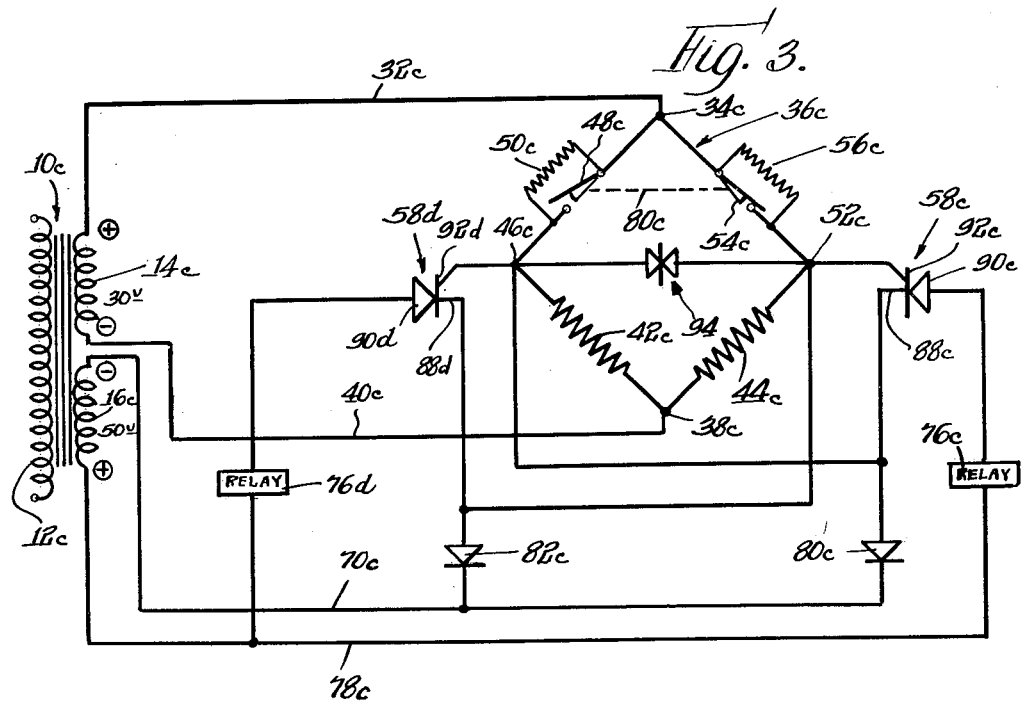
FIG. 3 is a schematic wiring diagram of a further development of FIG. 2.

Referring now in greater particularity to the drawings, and first to FIG. 1, there will be sen a transformer indicated generally by the numeral 10 and having an input winding 12 adapted to be energized from the usual 110 volt alternating current commercially available. The transformer has two secondary windings, one winding 14 being a 20 volt winding, and the second secondary winding 16 being a 50 volt winding. The 20 volt winding 14 is connected through a fuse 18 to a bridge rectifier 20 using metallic rectifiers, such as copper oxide, silicon, or the like. The rectifier has a positive output terminal at 22 and a negative output terminal at 24. The voltages stated are examples only.

The 50 volt winding 16 is connected to another rectifier unit or bridge 26, which also preferably includes metallic rectifier elements, and which has a positive output terminal 28 and a negative output terminal 30.

The positive output terminal 22 of the rectifier 20 is connected by means of a wire 32 to a junction 34 of a bridge 36 shortly to be described in greater detail. The opposite corner or terminal 38 of the bridge 36 is connected by a wire 40 to the negative terminal 24 of the rectifier 20.

The bridge 36 comprises a 100 ohm 5 watt resistor 42 in the lower left quadrant, and a similar resistor 44 in the lower right quadrant (in the position shown in the drawing), these two resistors being connected in common to the input junction or terminal 38. The resistance value stated is an example only. The resistor 42 also is connected at a terminal 46 to a switch 48, the opposite side of this switch being connected to the terminal 34. A resistance 50 is shown across the switch 48, and as will be discussed more fully hereinafter, this represents the leakage resistance or impedance of the switch, due to moisture, corrosion, and the like as discussed in the opening paragraphs of the specification. The fourth terminal of the bridge 36 is indicated at 52 and is connected to the right or upper end of the resistor 44, and also to a switch 54, the opposite side of this switch being connected to the terminal 34. In addition, the switch 54 is paralleled by a resistance 56, again representing a leakage resistance or impedance.

The circuit further includes a transistor 58 having the base 60 thereof connected to the terminal 52. The emitter 62 is connected by a wire 64 leading to a junction 66 with a wire 68 connected to the bridge terminal 46. The junction 66 is connected by a wire 70 to the positive terminal 28 of the second or 50-volt rectifier unit 26. The collector 72 of the transistor 58 is connected by a wire 74 to a relay coil 76, the opposite side of the relay being connected by a wire 78 to the negative terminal 30 of the second or 50-volt rectifier unit 26.

The two switches 48 and 54 are ganged as indicated by the dashed line at 80. The connection is such that when one of the switches is open, the other is closed, and vice versa. This ganged relationship may be that of a conventional two circuit limit switch. The switches are mechanically controlled, as by a dog on a machine tool. As will be obvious, the resistance of either switch is essentially zero when it is closed. The leakage path resistances 50 and 56 may get down to only a few ohms resistance, but more typically will be considerably higher than this. In any event, it is to be expected that the leakage path will never become as low as closed contact resistance. Hence, the resistance of a switch in open position, even with a rather substantial shorting path, will be somewhat above the closed resistance. The bridge circuit 36 is well able to detect the difference between these resistances.

In the switch position shown, with the switch 54 closed and the switch 48 opened, the terminal 52 will be at substantially the same potential as the terminal 34. Since the leakage resistance 50 is assumed something greater than zero, then the potential of the terminal 46 will necessarily be below that of the terminal 34. Thus, the terminal 52 is positive relative to the terminal 46. The transistor 58 is arranged to conduct when the base is negative relative to the emitter 62, and hence in the position shown and just described the transistor will not conduct, and the relay 76 will not be energized.

When the conditions are reversed, that is with the switch 54 open, and the switch 48 closed, the terminal 52 will be negative relative to the terminal 46, and the transistor will conduct, thereby energizing the relay 76 to effect the desired control function, such as stopping or reversing the movement of a machine tool.

The above described circuit is generally quite adequate for all circumstances. Even extremely low resistance leakage paths do not cause malfunctioning. However, there is one other contingency which is guarded against in the circuit of FIG. 2. Relay 76 may be equipped with one or more normally closed contacts which properly control machine functions when the switches are positioned to de-energize the relay coil. In case of a power failure, relay 76 will be de-energized and these normally closed contacts will close. During the power interruption there will, of course, be no functions due to these contact closures. However, upon re-establishment of the power supply, there may be sufficent delay in the pick-up of the relay to allow some undesired circuit operation to be initiated by momentary passage of current through the normally closed contacts. In the modified circuit of FIG. 2, there are two relays controlled by the relative switch positions. One relay is energized when the switches are in one relative position and the other relay is energized by the opposite switch condition. No normally closed contacts are used on either relay. In case of power interruption, both relays drop out and all contacts are opened. When power is resumed, only the proper relay will be re-energized and, hence, only the contacts consistent with the existing switch position will be closed.

In the embodiment of FIG. 2, most of the parts are similar to FIG. 1. Hence, similar numerals are used with the addition of the suffix $a$. A second transistor and second relay are used, and the corresponding parts thereof are similarly identified with the addition of the suffix $b$. The essential differences are that the bases of the two transistors 58$a$ and 58$b$, which for example may be of the 2N459 type, are respectively connected to the opposite corners of the bridge, the base 60$a$ being connected to the terminal 52$a$, and the base 60$b$ being connected to the terminal 46$a$. The collector 72$a$ is connected to the relay 76$a$, and the collector 72$b$ is connected to the relay 76$b$. The two relays are connected in common to the wire 78$a$ leading back to the 50-volt rectifier unit 26$a$.

In addition to the foregoing, the emitter 62$a$ is returned to the line 70$a$ through a diode 81, polarized as shown. The emitter 62$b$ similarly is returned to the line 70$a$ through a diode 82, polarized in the same direction as the diode 81. These diodes are provided to isolate the bridge 36$a$ to avoid shorting out through the power supply for the transistors.

The emitter 62$a$ also is connected to the bridge terminal 46$a$ through a diode 84, polarized as shown, and the emitter 62$b$ is similarly connected through a diode 86 to the bridge terminal 52$a$ and the base 60$a$. The diodes 84 and 86 eliminate a shunt path that would substantially reduce the bridge output.

Operation of the embodiment of FIG. 2 will be apparent from what has been discussed heretofore. Unbalancing of the bridge and operation of the transistors occurs in the same nature as in accordance with FIG. 1, whereby to actuate one or the other of the relays 76$a$, 76$b$, the diodes 81, 82, 84, and 86 functioning as just described. In the event of a power failure, whichever relay was energized becomes de-energized. Upon power resumption, only the relay which was previously energized is again energized and, since no normally closed relay contacts are involved, there is no ambiguity. That is, only those contacts which were closed prior to the power interruption are closed after the interruption is over.

A further embodiment of the invention is shown in FIG. 3. This embodiment of the invention is quite similar to FIG. 2, and numerals are utilized similar to those previously used in connection with FIGS. 1 and 2, the suffix $c$ being used in this instance, and the suffix $d$ being used for duplicated parts, such as the relays and the electronic switches. The essential change in the circuit of FIG. 3 is that instead of transistors, the circuit embodies the newly developed semi-conductor controlled switches. Specifically, these controlled switches are indicated at 58$c$ and 58$d$, and are of the type known as silicon pnpn controlled switches. Each has a cathode 88$c$ and 88$d$ respectively, an anode 90$c$ and 90$d$ respectively, and a gate 92$c$ and 92$d$ respectively. Since the controlled switches are self rectifying, the circuit will operate entirely on alternating current, and the rectifying bridges 20 and 26 are eliminated. Thus, the winding 14$c$ of the transformer 10$c$, illustrated as at 30 volts, is connected with one end to the bridge junction 34$c$ and with the other end to the bridge junction 38$c$. The bridge junction or terminal 46$c$ is connected directly to the gate 92$d$ of the controlled switch 58$d$, while the junction or terminal 52$c$ is connected directly to the gate 92$c$ of the controlled switch 58$c$.

One end of the transformer winding 16$c$ is connected by means of a wire 78$a$ direct to the relays 76$c$ and 76$d$, the opposite sides of the relays respectively being connected to the anodes 90$c$ and 90$d$ of the controlled switches. The cathodes of the controlled switches are respectively connected by diodes 81$c$ and 82$c$ to a line 70$c$ returning to the opposite side of the transformer winding 16$c$. The diodes 81$c$ and 82$c$ comprise blocking rectifiers for preventing the common supply connection to the control switches from shorting out the bridge 36$c$.

With the mechanical switches 48$c$ and 54$c$ in the position shown, and with the phasing as indicated, i.e. with the top of the winding 14$c$ momentarily positive and the bottom negative, and with the bottom of the winding 16$c$ momentarily positive and the top momentarily negative, the controlled switch 58$c$ will be in the "on" or conducting condition, and relay 76$c$ would be energized. Conversely, the controlled switch 58$d$ would be in the "off" or non-conducting condition, and the relay 76$d$ would be de-energized. As will be appreciated, the reverse would be true if the relative positions of the switches 48$c$ and 54$c$ were reversed.

In addition to the foregoing parts noted, the circuit of FIG. 3 includes a Zener diode 94 connected between the junctions or terminals 46$c$ and 52$c$ of the bridge 36$c$ for limiting the voltage applied to the gates 92$c$ and 92$d$ of the controlled switches 58$c$ and 58$d$.

Figure 4:
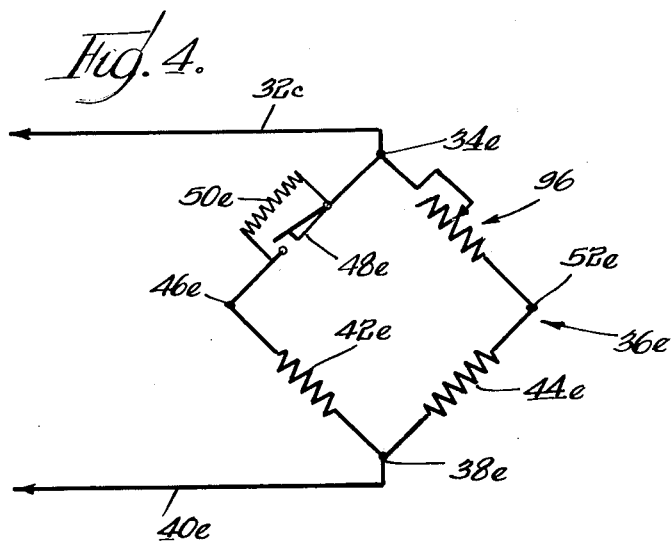
FIG. 4 is a schematic wiring diagram of a modified bridge circuit usable in any of the preceding circuits.

FIG. 4 represents a variation in the bridge circuit which could be used in any of the foregoing complete circuits. In this instance, similar numerals are used with the addition of the suffix $e$ to identify similar parts. The bridge circuit of FIG. 4 differs from that in a previous embodiment in that only the upper left arm of the bridge includes a switch, as indicated at 48e. The upper right arm comprises a variable resistor or rheostat as indicated at 96. The value of the resistor 96 is adjusted to be a little higher than the resistance of the switch 48e in closed position, and lower than the leakage resistance 50e of the switch 48e when open. The circuit of FIG. 4 is inferior to the previous circuits, since the added resistor 96 would have to be carefully adjusted to conditions. However, the circuit is operative, and illustrates a modification of the basic invention.

It will now be apparent that there has herein been presented a limit switch circuit arrangement which is not susceptible to false operation due to moisture caused by condensation of coolant or atmospheric moisture, or by corrosion. In short, the switch may work in a wet atmosphere and may be termed a "wet limit switch."

The specific examples of the invention as herein shown and described are for illustrative purposes only. Various changes in structure will no doubt occur to those skilled in the art, and are to be understood as coming within the purview of this invention insofar as they fall within the spirit and scope of the appended claims.

The invention is claimed as follows:

1. A switch construction suitable for use in a damp environment comprising a pair of switches, means mechanically interconnecting said switches whereby when one switch is closed the other is open and vice versa, electrical means including means for supplying a voltage electrically interconnected with said switches for comparing the resistances of said pair of switches, and controlled means electrically connected to said comparing means, said comparing means effecting operation of said controlled means when a predetermined one of said switches is of less resistance than the other.

2. A switch construction as set forth in claim 1 wherein the comparing means comprises electrical balance means and an electronic valve biased thereby.

3. A switch construction as set forth in claim 2 wherein the electronic valve comprises a semi-conductor.

4. A switch construction as set forth in claim 3 wherein the semi-conductor comprises a transistor.

5. A switch construction suitable for use in a moist environment comprising a pair of switches, means mechanically interconnecting said switches whereby when one switch is closed the other is open and vice versa, an electrical bridge cricuit including said switches in a pair of adjacent arms thereof and having output terminals at the opposite ends of the arms including said switches, controlled means, and electrical means interconnecting said corners of said bridge circuit and said controlled means for operating said controlled means in accordance with the unbalance of said bridge circuit.

6. A switch construction as set forth in claim 5 wherein the electrical means interconnecting the bridge circuit and the controlled means comprises an electronic valve.

7. A switch construction as set forth in claim 6 wherein the electronic valve comprises a semi-conductor.

8. A switch construction as set forth in claim 7 wherein the semi-conductor comprises a transistor.

9. A switch construction suitable for use in a moist environment comprising a pair of switches, means mechanically interconnecting said switches whereby when one switch is closed the other is open and vice versa, a four-cornered electric bridge circuit incorporating said switches respectively between the first and second and the first and fourth corners and including impedance arms between the second and third and the third and fourth corners, means applying a direct current potential across the first and third corners, a transistor having a base, a collector, and an emitter, means connecting said base to the second corner of said bridge circuit, means connecting the emitter to the fourth corner of said bridge circuit, direct current power supply means for said transistor connected to said emitter and said collector, and controlled means incorporated between the transistor direct current power supply means and the collector, whereby the condition of unbalance of said bridge controls the conduction of said transistor which in turn controls the operation of said controlled means.

10. A switch construction suitable for use in a moist environment comprising a pair of switches, one of said switches normally being open and the other normally being closed, means mechanically interconnecting said switches whereby when one switch is closed the other is open and vice versa, four-cornered bridge circuit means incorporating said switches respectively between the first and second and between the fourth and first corners, impedance arms respectively connected between said second and third and said third and forth corners, direct current potential means connected across the first and third corners of said bridge circuit, a first transistor, a second transistor, each of said transistors having a base, an emitter, and a collector, transistor direct current power supply means, a pair of controlled devices connected to a common point, means connecting one polarity of said transistor power supply means to said common point, means respectively connecting the collectors of said transistors to said controlled devices, means connecting the base of one of said transistors to the second corner of said bridge circuit, means connecting the other transistor base to the fourth corner of said bridge circuit, and means connecting the emitters of said transistors to the opposite polarity of said transistor power supply.

11. A switch construction as set forth in claim 10 and further including a pair of unilaterally conducting devices one of which interconnects the base of one transistor and the emitter of the other transistor and the second of which interconnects the base of the other transistor and the emitter of the first mentioned transistor.

12. A switch construction as set forth in claim 10 wherein the connection from the transistor power supply to each transistor base includes a unilaterally conducting device.

13. A switch construction as set forth in claim 11 wherein the connection from the transistor power supply to each transistor base includes a unilaterally conducting device.

References Cited in the file of this patent

UNITED STATES PATENTS

| | | |
|---|---|---|
| 2,478,000 | Miller | Aug. 2, 1949 |
| 2,843,745 | Smith | July 15, 1958 |
| 2,859,402 | Schaeve | Nov. 4, 1958 |
| 2,945,133 | Pinckaers | July 12, 1960 |

OTHER REFERENCES

Brown et al.: Transistors: A New Class of Relays Control Engineering, December 1956, pages 70–76.